Feb. 16, 1943. G. M. CLASS 2,311,211
TURNING ATTACHMENT
Filed Oct. 28, 1939 2 Sheets-Sheet 1

INVENTOR
GEORGE M. CLASS
BY
Fred G. Parsons
ATTORNEY

Feb. 16, 1943.　　　　G. M. CLASS　　　　2,311,211
TURNING ATTACHMENT
Filed Oct. 28, 1939　　　　2 Sheets-Sheet 2

INVENTOR
GEORGE M. CLASS
BY
Fred G. Parsons
ATTORNEY

Patented Feb. 16, 1943

2,311,211

UNITED STATES PATENT OFFICE 2,311,211

TURNING ATTACHMENT

George M. Class, Madison, Wis., assignor to Gisholt Machine Company, Madison, Wis., a corporation of Wisconsin Application October 28, 1939, Serial No. 301,767

9 Claims. (Cl. 82—35)

This invention relates to an attachment or tool adjustable for turning various work diameters, for use on lathes and the like.

It is an object of the invention to effect a turning attachment having various improvements over previous tools, particularly in matters relating to convenience of adjustment and operation, and to rigidity of support for the work piece being turned.

Further purposes are to generally simplify and improve the construction and operation of turning attachments, especially where the attachment is adjustable for turning various diameters, and particularly attachments for lathes.

Further objects and purposes will appear from the accompanying description, it being understood that modifications are contemplated and that the invention includes such modified structure as may be within the scope of the claims.

The same reference characters have been applied to the same parts throughout, and in the drawings.

Figure 2:
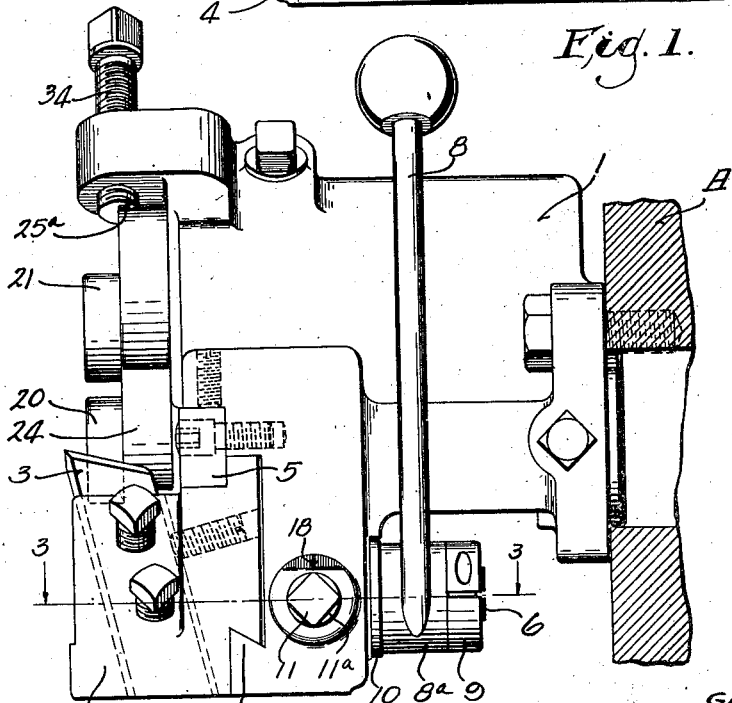
Figure 2 is a front elevation of the same attachment, showing a sectional portion of the machine to which the tool is attached.

It will be understood that the work to be turned is revolved and traversed relative to the turning tool. In Fig. 2 a body or frame 1 is shown fixed to the turret portion A of a turret lathe, in which the work is rotated with the lathe spindle, not shown, and the tool is bodily traversed with the lathe turret, the frame 1 being provided with a bore 2 coaxial with the lathe spindle and extending through the frame to receive the turned work end as it moves past the turning tool 3.

The turning tool 3 is carried for adjustment relative to frame 1 and in a direction transverse to the work axis on a tool slide 4, the slide being guided by ways 4a and gib means such as gib 5. A screw or stud 6 is rotatably threaded with the slide and extends through a slot or opening 7 to receive the hub 8a of a hand lever 8, the bore of the hub being slidably keyed with the extended screw portion and adjustably retained thereon by the means of a split clamp nut 9 threaded on the outer end of the screw. A plate or washer 10 provides a thrust abutment against which the hub 8a may seat when the lever 8 is turned from the dotted line position, Fig. 1, to the full line position for rigidly clamping the tool slide 4 with the main body 1.

Figure 3:
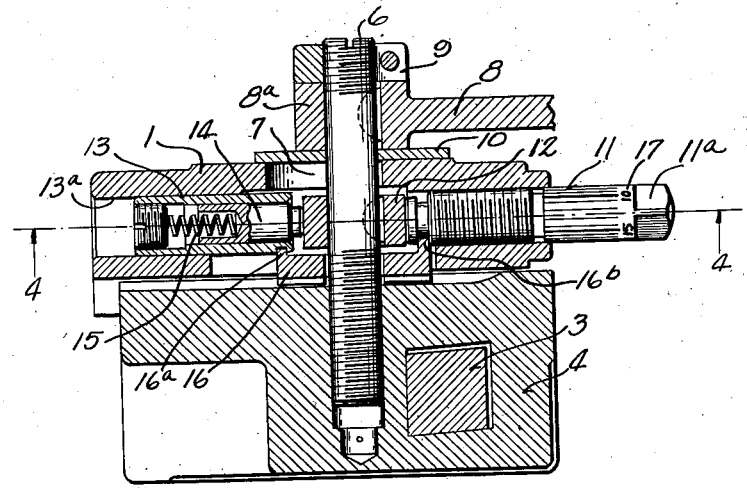
Figures 3, 4, 5 are respectively sections taken along the line 3—3 of Fig. 2, 4—4 of Fig. 3 and 5—5 of Fig. 1.
Figure 4:
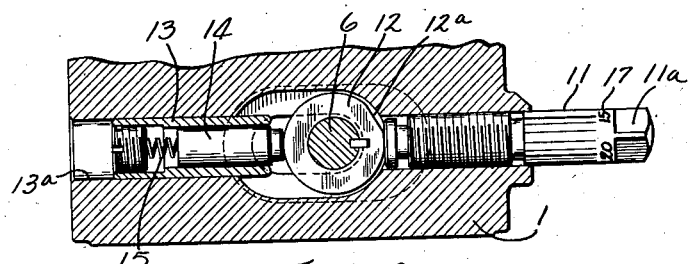

A stop or abutment screw 11 is rotatably threaded with the body 1 for axial adjustment, as best shown in Figs. 3, 4; the exposed screw end being squared as at 11a for a suitable adjusting wrench, not shown. The inner end of the screw provides an abutment for a cam sleeve 12 which is keyed on the stem of the screw 6 to turn therewith. An abutment member 13 is slidably guided in an opening 13a for movement parallel with the axis of stop screw 11 and carries a plunger 14 coaxial with screw 11 and continuously forced to the right, Fig. 3, relative to the member 13 by a spring 15. The member 13 is retained in predetermined spacing relative to the end of stop screw 11 by the means of a fork member or yoke 16 having fork ends 16a, 16b respectively engaging a slot in the abutment member and an annular groove in the screw. The construction described is such that the spring plunger 14 continuously presses the cam sleeve 12 to the right in Fig. 3, against the abutment end of stop screw 11, whereby the position of the tool slide 4 and of tool 3 carried thereby is determined by the adjustment of the screw 11. Also the connection of abutment member 13 to the stop screw through yoke 16 insures that the slide positioning pressure of spring 15 is substantially the same in any position of stop screw adjustment.

To facilitate a predetermined change of the work diameter turned by the tool 3 the exposed portion of stop screw 11 is graduated to be readable in predetermined units of axial screw movement, as at 17, the graduations being readable against an indicator arrow 18.

Figure 1:
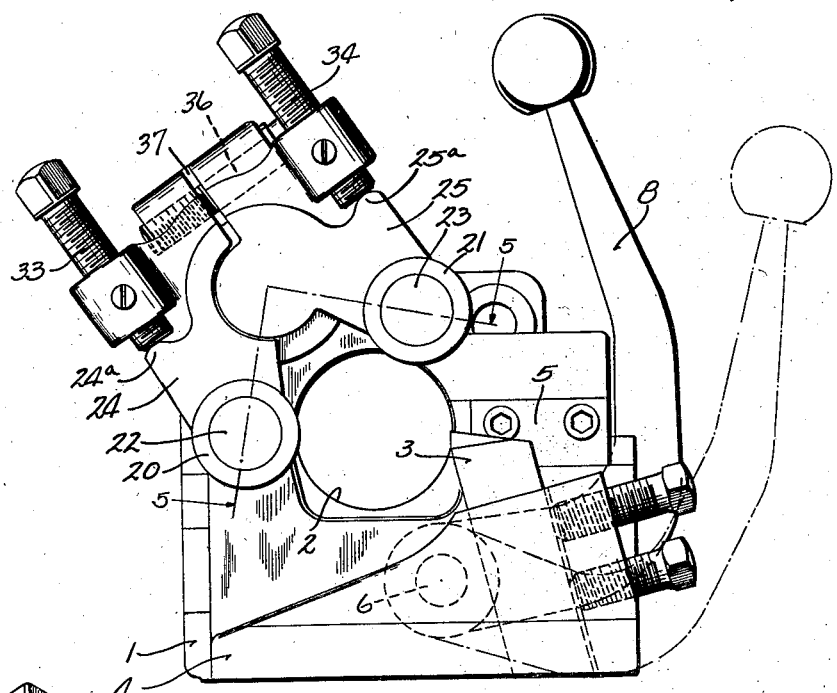
Figure 1 is a left end elevation of a turning attachment which incorporates the invention.

As the hand lever 8 is turned from the dotted line position, Fig. 1, to the full line position there shown, the abutment end of stop screw 11, Fig. 4, is turned from a reduced diameter cam portion 12a of the sleeve 12 to abut the full diameter portion of the sleeve, as shown, whereby to position the tool slide and tool in cutting position, and substantially immediately thereafter the continued rotation of the hand lever causes screw 6 to clamp the tool slide in such cutting position, the split nut 9 being suitably adjusted to effect the clamping at the proper angular position of the lever. As the hand lever 8 is turned from the full line position, Fig. 1, to the dotted line position there shown, the reduced diameter cam portion 12a is turned to a position opposite the abutment end of the stop screw; the slide clamp previously mentioned being released by the turning of screw 6, and the spring plunger 14 then moves the tool slide 4 and tool 3 to the right in Fig. 1 to a position where the tool is spaced away from the turned work and may be withdrawn from the finished work piece, to the right in Fig. 2, while out of contact therewith.

A turning tool such as 3, during turning operations, sets up lateral pressure on the work piece, and unless the work piece is properly supported there might be chatter, as well as failure of the tool to cut to proper size.

To resist such lateral tool pressure and steady the workpiece against chatter or vibration, steady rest means are provided including work contacting rolls 20, 21. The rolls are each mounted on anti-friction bearings such as 20a and respectively supported on studs 22, 23. The stud 22 for roller 20 is fixed on an arm 24 fixed with a shank 25 which is closely but pivotally fitted in a body bore 26. The stud 23 for roller 21 is fixed on an arm 27 fixed with a shank 28 which is similarly pivotally fitted in an axial bore 29 of the shank 25. A stud 30 fixed with the shank 28 has a threaded outer end carrying lock nuts 30a, 30b which may be adjusted against an abutment plug 31 slidably keyed in the bore of shank 26, the plug being enlarged at 31a to provide an abutment shoulder.

Figure 5:
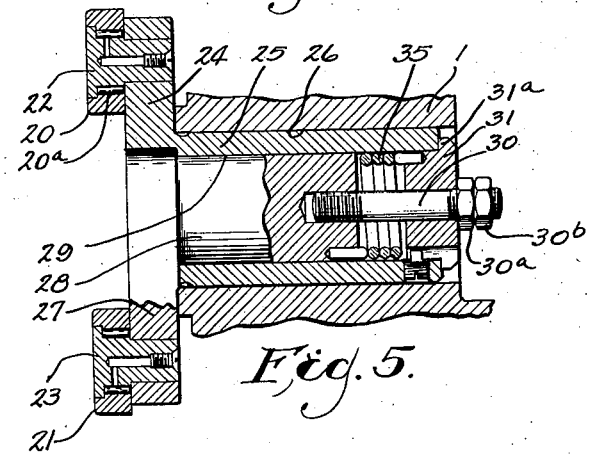

The described arrangement permits pivotal movement of either of the work steadying rolls 20, 21 about the common axis of the supporting shanks 25, 28. To adjustably limit the outward roll movement there are provided abutment screws 33, 34 each adjustably threaded in suitable ears or brackets fixed on the body 1, the screws respectively engaging abutment portions 24a, 25a on the arms 24, 25 which carry the different rolls. The rolls are each continuously spring urged in a direction for the abutments to engage screws 33, 34 by the means of a torsion spring 35, Fig. 5, having its one end engaging the plug 31 and its other end engaging the shank 28 and operating to urge the shanks 25, 28 and the rolls carried thereby in opposite directions of rotation. The rolls, together with their supporting shanks may be unitarily adjusted axially, to the left of the position shown in Fig. 5, whereby the rolls may be set to engage the turned end of a workpiece as soon as the tool has turned a sufficient work surface for the rolls to engage upon.

The rolls 20, 25 may each be rigidly clamped in any position of axial or oscillatory adjustment by the means of a clamp screw 36, the body 1 being slotted as at 37 to permit the clamp screw to contract the bore 26 on the outer shank 25. The shank 25, by reason of the inner bore 29, is sufficiently thin to contract upon and clamp the inner solid shank 28. The wall of the shank 25 may, if preferred, also be slotted lengthwise to assist the clamping of the inner shank.

What is claimed is:

1. In a turning attachment providing a frame and a tool slide guided on said frame for adjustment transversely with respect to the work axis, the combination of adjusting and clamping means for said slide including a hand lever, a train connecting said lever and said slide for movement of said slide to turning position including cam means determining said turning position, a clamp for said slide, and means operatively connecting said hand lever for actuation of said clamp to clamping position thereof after said slide occupies said turning position determined by said cam.

2. In a turning attachment the combination of a frame providing an opening to receive a work piece axially during a turning operation, a tool slide guided on said frame for adjustment in a path transverse with respect to the work axis, means for adjusting said slide, means for clamping said slide, trains connecting said hand lever for operation of each of said means, and means for adjustment of one of said trains to alter the relative position of said lever respecting the operating of one of said means.

3. In a turning attachment the combination of a frame providing an opening to receive a work piece axially during a turning operation, a tool slide guided on said frame for adjustment in a path transverse to the work piece axis, a clamp for said slide including a rotatable screw threadedly engaging the slide and abutment means on said frame limiting the axial movement of said screw, a hand lever for rotation of said screw, a stop associated with said frame for limiting the movement of said slide, and cam means for movement of said slide and rotatable with said screw while contacting said stop.

4. The combination of claim 3 including means for adjusting said clamp screw relative to the point of operation of its abutment means.

5. In a turning attachment the combination of a frame providing an opening to receive a work piece axially during a turning operation, a tool slide guided on said frame for adjustment in a path transverse to the work axis, a stop on said frame for limiting the movement of said slide and adjustable in a direction parallel with said path, a spring abutment member connected for adjustment with said stop, and a spring seated on said spring abutment member and continuously urging said slide in the direction of said stop.

6. In a turning attachment the combination of a frame providing an opening to receive a work piece axially during a turning operation, a tool slide guided on said frame for adjustment in a path transverse to the work axis, a stop on said frame for limiting movement of said slide and adjustable in a direction parallel with said path, and spring means thrusting said slide in the direction of said stop including a reaction member for the opposite direction of spring thrust and connected for adjustment with said stop whereby to maintain the thrust of said spring means substantially constant in various positions of the stop.

7. In a turning attachment the combination of a frame providing an opening to receive a work piece axially during a turning operation, a tool slide guided on said frame for adjustment in a path transverse to the work axis, a rotatable stop screw threadedly carried by said frame for axial adjustment parallel with said path, a cam rotatably carried by said slide to engage an abutment end of said stop screw, a spring thrusting in one direction to urge said cam in the direction of stop screw engagement, said cam being formed for rotation thereof to move said slide relative to said stop screw, and a spring abutment member for the other direction of spring thrust and connected for said axial adjustment with said stop screw.

8. In a turning attachment the combination of a frame providing an opening to receive a work piece axially during a turning operation, a tool slide guided on said frame for adjustment in a path transverse to the work axis, a rotatable stop screw threadedly carried by said frame for axial adjustment parallel with said path, a cam rotatably carried by said slide to engage an abutment end of said stop screw, a spring thrusting in one direction to urge said cam in the direction of stop screw engagement, said cam being formed for rotation thereof to move said slide relative to said stop screw, a spring abutment member for the other direction of spring thrust and connected for said axial adjustment with the stop screw, clamp means for said slide, a hand lever, and a plurality of trains respectively connecting said hand lever for rotation of said cam and for operation of said clamp means.

9. In a turning attachment providing a frame and a tool carrying slide guided on said frame for adjustment in a path transverse to the work axis, the combination of means for opposing the thrust of a turning tool carried by said slide including abutment members carried on said frame, arms carried on said frame for pivotal engagement respectively with different of said abutment members, rolls respectively carried by the different arms for movement therewith to engage the rolls with spaced points on the periphery of the work piece, and spring means continuously urging said arms in a direction for said rolls to disengage the work piece and for said arms to engage the respective abutments, said spring means being housed within said frame.

GEORGE M. CLASS.